(12) United States Patent
Tennenhaus et al.

(10) Patent No.: US 9,858,075 B2
(45) Date of Patent: Jan. 2, 2018

(54) RUN-TIME CODE PARALLELIZATION WITH INDEPENDENT SPECULATIVE COMMITTING OF INSTRUCTIONS PER SEGMENT

(71) Applicant: Centipede Semi Ltd., Netanya (IL)

(72) Inventors: Omri Tennenhaus, Jerusalem (IL); Noam Mizrahi, Hod Hasharon (IL); Alberto Mandler, Zichron Yaakov (IL)

(73) Assignee: CENTIPEDE SEMI LTD., Netanya (IL)

( * ) Notice: Subject to any disclaimer, the term of this patent is extended or adjusted under 35 U.S.C. 154(b) by 249 days.

(21) Appl. No.: 14/960,385

(22) Filed: Dec. 6, 2015

(65) Prior Publication Data

US 2017/0161066 A1 Jun. 8, 2017

(51) Int. Cl.
*G06F 9/30* (2006.01)
*G06F 9/38* (2006.01)

(52) U.S. Cl.
CPC ........ *G06F 9/3005* (2013.01); *G06F 9/30098* (2013.01); *G06F 9/3836* (2013.01); *G06F 9/3855* (2013.01); *G06F 9/3857* (2013.01)

(58) Field of Classification Search
CPC .... G06F 9/3836; G06F 9/3842; G06F 9/3855; G06F 9/3857; G06F 9/3863
See application file for complete search history.

(56) References Cited

U.S. PATENT DOCUMENTS

| | | | |
|---|---|---|---|
| 5,765,016 A | 6/1998 | Walker | |
| 6,094,716 A | 7/2000 | Witt | |
| 7,600,221 B1 | 10/2009 | Rangachari | |
| 9,135,015 B1 | 9/2015 | Mizrahi et al. | |
| 9,208,066 B1 | 12/2015 | Mizrahi et al. | |
| 2008/0077777 A1 | 3/2008 | Lataille et al. | |
| 2012/0005444 A1 | 1/2012 | Rupley et al. | |
| 2015/0277925 A1 | 10/2015 | Sleiman | |
| 2015/0347140 A1 | 12/2015 | Col et al. | |

OTHER PUBLICATIONS

U.S. Appl. No. 14/924,833 Office Action dated Feb. 9, 2016.
Sorin et al.,"Register Renaming",ECE 252 / CPS 220 Lecture Notes, Dynamic Scheduling I, pp. 31-43, year 2009.

(Continued)

*Primary Examiner* — Benjamin Geib
(74) *Attorney, Agent, or Firm* — D. Kligler I.P. Services Ltd.

(57) ABSTRACT

A method includes, in a processor that processes multiple segments of a sequence of instructions of program code, wherein each segment is defined as either speculative or non-speculative, dispatching the instructions of the segments into at least one instruction buffer. The instructions of the segments are executed, and, in each segment, at least some of the executed instructions of the segment are speculatively-committed from the at least one instruction buffer independently of any other segment. Dispatching the instructions includes dispatching the instructions of a first segment into a first region of the at least one instruction buffer, and dispatching the instructions of a second segment, which occurs later in the program code than the first segment, into a second region of the at least one instruction buffer before all the instructions of the first segment have been dispatched into the first region.

32 Claims, 7 Drawing Sheets

(56) References Cited

OTHER PUBLICATIONS

Akkary et al., "Checkpoint Processing and Recovery:Towards Scalable Large Instruction Window Processors", Proceedings of the 36th International Symposium on Microarchitecture, 12 pages, 2003.
Akkary et al.,"Checkpoint Processing and Recovery: An Efficient,Scalable Alternative to Reorder Buffers", IEEE Micro, vol. 23, Issue 6, pp. 11-19, Nov.-Dec. 2003.
Hennessy et al., "Computer Architecture; A Quantitative Approach", 5th edition, MK Series in Computer Architecture and Design, 848 pages, Oct. 25, 2011.
Monreal et al.,"Dynamic Register Renaming Through Virtual-Physical Registers", Journal of Instructions—Level Parallelism, 20 pages, Jan. 2000.
Cristal et al., "Out-of-Order Commit Processors", IEEE Proceedings—Software, pp. 48-59, Feb. 14-18, 2004.
Sima, D., "The Design Space of Register Renaming Techniques", IEEE Micro, vol. 20, Issue 5, pp. 70-83, Sep. 2000.
Shen, J., "EE382A Lecture 6: Register Renaming", Department of Electrical Engineering,Stanford University, EE382A, 40 pages, Autumn 2009.
Ubal et al., "The Impact of Out-of-Order Commit in Coarse-Grain, Fine-Grain and Simultaneous Multithreaded Architectures", IEEE International Symposium on Parallel and Distributed Processing,11 pages, Apr. 14-18, 2008.
Tennenhaus et al., U.S. Appl. No. 14/924,833, filed Oct. 28, 2015.
Hwu et al., "Checkpoint Repair for High-Performance Out-of-Order Execution Machines"., IEEE Transactions on Computers, vol. C-36, No. 12, pp. 1496-1514, Dec. 1987.

Akkary et al.,"An Analysis of a Resource Efficient Checkpoint Architecture", ACM Transactions on Architecture and Code Optimization, vol. 1, No. 4, pp. 418-444, Dec. 2004.
Kruijf et al., "Idempotent Processor Architecture", 44th Annual IEEE/ACM International Symposium on Microarchitecture, 12 pages, Dec. 3-7, 2011.
Mutlu et al., "Runahead Execution: an Effective Alternative to Large Instruction Windows", IEEE Micro, pp. 20-25, Nov.-Dec. 2003.
Vijayan et al., "Out-of-Order Commit Logic With Precise Exception Handling for Pipelined Processors", School of Computer Science and Engineering, College of Engineering, Anna University, Chennai, India, 5 pages, Oct. 3, 2002.
Moudgill et al., "Register Renaming and Dynamic Speculation: an Alternative Approach", Proceedings of the 26th Annual International Symposium on Microarchitecture, pp. 202-213, Dec. 1-3, 1993.
Chaudhry, S.,"Rock: A Sparc CMT Processor", Sun Microsystems, 25 pages, Aug. 26, 2008.
Chaudhry et al.,"Rock: A High-Performance Sparc CMT Processor", IEEE Micro, 11 pages, Mar./Apr. 2009.
Mizrahi et al., U.S. Appl. No. 14/690,424, dated Apr. 19, 2015.
Mizrahi et al., U.S. Appl. No. 14/578,516, dated Dec. 22, 2014.
Mizrahi et al., U.S. Appl. No. 14/578,518, dated Dec. 22, 2014.
Mizrahi et al., U.S. Appl. No. 14/673,884, dated Mar. 31, 2015.
Mizrahi et al., U.S. Appl. No. 14/673,889, dated Mar. 31, 2015.
Duong et al., "Compiler Assisted Out-Of-Order Instruction Commit", Center for Embedded Computer Systems, University of California, Irvine, CECS Technical Report 10-11, 27 pages, Nov. 18, 2010.
International Application # PCT/IB2016/055346 Search Report dated Dec. 18, 2016.
International Application # PCT/IB2016/054706 Search Report dated Nov. 29, 2016.

RUN-TIME CODE PARALLELIZATION WITH INDEPENDENT SPECULATIVE COMMITTING OF INSTRUCTIONS PER SEGMENT

FIELD OF THE INVENTION

The present invention relates generally to processor design, and particularly to methods and systems for run-time code parallelization.

BACKGROUND OF THE INVENTION

In most pipelined microprocessor architectures, one of the final stages in the pipeline is committing of instructions. Various committing techniques are known in the art. For example, Cristal et al. describe processor microarchitectures that allow for committing instructions out-of-order, in "Out-of-Order Commit Processors," IEE Proceedings—Software, February, 2004, pages 48-59, which is incorporated herein by reference.

Ubal et al. evaluate the impact of retiring instructions out of order on different multithreaded architectures and different instruction-fetch policies, in "The Impact of Out-of-Order Commit in Coarse-Grain, Fine-Grain and Simultaneous Multithreaded Architectures," IEEE International Symposium on Parallel and Distributed Processing, April, 2008, pages 1-11, which is incorporated herein by reference.

Some suggested techniques enable out-of-order committing of instructions using checkpoints. Checkpoint-based schemes are described, for example, by Akkary et al., in "Checkpoint Processing and Recovery: Towards Scalable Large Instruction Window Processors," Proceedings of the 36th International Symposium on Microarchitecture, 2003; and by Akkary et al., in "Checkpoint Processing and Recovery: An Efficient, Scalable Alternative to Reorder Buffers," IEEE Micro, volume 23, issue 6, November, 2003, Pages 11-19, which are incorporated herein by reference.

SUMMARY OF THE INVENTION

An embodiment of the present invention that is described herein provides a method including, in a processor that processes multiple segments of a sequence of instructions of program code, wherein each segment is defined as either speculative or non-speculative, dispatching the instructions of the segments into at least one instruction buffer. The instructions of the segments are executed, and, in each segment, at least some of the executed instructions of the segment are speculatively-committed from the at least one instruction buffer independently of any other segment. Dispatching the instructions includes dispatching the instructions of a first segment into a first region of the at least one instruction buffer, and dispatching the instructions of a second segment, which occurs later in the program code than the first segment, into a second region of the at least one instruction buffer before all the instructions of the first segment have been dispatched into the first region.

In some embodiments, the at least one instruction buffer includes one or more reorder buffers (ROB) or instruction-queue buffers. Typically, a segment is defined as non-speculative if the segment is the earliest segment in the program code that has at least one instruction that is not committed, and defined as speculative otherwise.

In some embodiments, speculatively-committing the executed instructions includes updating for each segment an architectural-to-physical register mapping pertaining to the most-recent speculatively-committed instruction in the segment. In an embodiment, updating the architectural-to-physical register mapping includes retaining a speculative architectural-to-physical register mapping of a speculative segment until the speculative segment is flushed or merged with another segment.

In some embodiments, the method includes, upon speculatively or non-speculatively committing all the instructions in a first segment, merging the architectural-to-physical register mapping of the first segment with the architectural-to-physical register mapping of a second segment that immediately follows the first segment in the program code. In an embodiment, the method includes, if the first segment was non-speculative, defining a merged segment resulting from the merged first and second segments as non-speculative.

In another embodiment, merging the architectural-to-physical register mapping includes producing for the second segment a merged architectural-to-physical register mapping by choosing, per architectural register, either a mapping of the architectural register used in the first segment, or the mapping of the architectural register used in the second segment. In yet another embodiment, merging the architectural-to-physical register mapping includes releasing at least some physical resources of the architectural-to-physical register mapping of the first segment.

In an embodiment the method includes, following merging the architectural-to-physical register mapping, releasing a data structure holding the architectural-to-physical register mapping of the first segment. In a disclosed embodiment, speculatively-committing the executed instructions includes initiating speculative committing of a given segment while the architectural-to-physical register mapping is missing a mapping of at least one architectural register used in the given segment. In an example embodiment, speculatively-committing the executed instructions includes evicting one or more of the speculatively-committed instructions from the at least one instruction buffer.

There is additionally provided, in accordance with an embodiment of the present invention, a method including, in a processor that processes multiple segments of a sequence of instructions of program code, writing the instructions of the segments into at least one instruction buffer, executing the written instructions, speculatively-committing at least some of the executed instructions of each segment independently of any other segment, and evicting one or more of the speculatively-committed instructions from the at least one instruction buffer. Instructions belonging to a first segment, which occurs earlier in the program code than a second segment, are executed. In response to detecting that the processing of the instructions of the first segment requires flushing of instructions starting from a given instruction in the second segment, the instructions belonging to the second segment are flushed even when the given instruction has been evicted from the at least one instruction buffer.

In some embodiments, executing the instructions belonging to the first segment is performed after at least one of the instructions belonging to the second segment has been evicted. In some embodiments, the method includes, upon flushing the given instruction, recovering a state of the second segment by reverting to a previously-saved state that precedes the flushed instructions of the second segment. In an embodiment, the given instruction is a load instruction, which accesses the same address as a store instruction in the first segment.

There is further provided, in accordance with an embodiment of the present invention, a processor including at least one instruction buffer and circuitry. The circuitry is configured to process multiple segments of a sequence of instructions of program code, wherein each segment is defined as either speculative or non-speculative, to dispatch the instructions of the segments into the at least one instruction buffer, to execute the instructions of the segments, and, in each segment, to speculatively-commit at least some of the executed instructions of the segment from the at least one instruction buffer independently of any other segment. The instructions of a first segment are dispatched into a first region of the at least one instruction buffer, and the instructions of a second segment, which occurs later in the program code than the first segment, are dispatched into a second region of the at least one instruction buffer before all the instructions of the first segment have been dispatched into the first region.

There is also provided, in accordance with an embodiment of the present invention, a processor including at least one instruction buffer and circuitry. The circuitry is configured to process multiple segments of a sequence of instructions of program code, to write the instructions of the segments into the at least one instruction buffer, to execute the written instructions, to speculatively-commit at least some of the executed instructions of each segment independently of any other segment, to evict one or more of the speculatively-committed instructions from the at least one instruction buffer, to execute instructions belonging to a first segment, which occurs earlier in the program code than a second segment, and, in response to detecting that the processing of the instructions of the first segment requires flushing of instructions starting from a given instruction in the second segment, to flush the instructions belonging to the second segment even when the given instruction has been evicted from the at least one instruction buffer.

The present invention will be more fully understood from the following detailed description of the embodiments thereof, taken together with the drawings in which:

DETAILED DESCRIPTION OF EMBODIMENTS

Overview

When a processor employs speculative mechanisms such as branch prediction, executed instructions can be committed only after verifying that all preceding speculative assumptions were true and after all the preceding instructions have updated the architectural state of the processor. Committing of instructions, and the associated releasing of physical resources of the processor, is one of the bottlenecks that limit the performance of run-time code parallelization.

Embodiments of the present invention that are described herein provide methods and apparatus for parallelizing the committing of instructions in a processor that processes multiple segments of the same program code in parallel.

In some embodiments, a processor processes multiple segments of program code in parallel. Per segment, the processor typically fetches instructions from memory, decodes the instructions, performs register renaming, dispatches the instructions, issues the instructions for execution and commits the executed instructions.

At any given point in time, the earliest segment being processed is defined as a non-speculative segment, also referred to as a Time-Consistent (TC) segment. The other segments being processed are considered speculative. When the processing of the non-speculative segment is complete, e.g., when all the instructions of the non-speculative segment are committed, the next segment becomes the non-speculative segment.

In some embodiments, the processor supports two levels of instruction commit—Speculative committing and non-speculative committing. The processor processes the segments at least partially in parallel, and in particular speculatively-commits the instructions of each segment independently of any other segment. When a speculative segment becomes non-speculative, its speculatively-modified architectural state becomes the committed architectural state of the processor.

In some embodiments, the processor speculatively-commits instructions independently per segment, using novel management of the processor instruction buffers (e.g., one or more reorder buffers or instruction-queue buffers). The embodiments described herein refer mainly to reorder buffers (ROB), but the disclosed techniques are applicable in a similar manner to instruction-queue buffers as well.

In some embodiments, the renamed instructions of the various segments are written to different respective regions in the ROB. The processor maintains, per segment, a respective speculative-commit database (DB) for at least some of the segments buffered in the ROB. As part of this database, the processor continuously updates a "commit register map"—A mapping of architectural registers to physical registers that is true for the most recently committed (speculatively or non-speculatively) instruction in the segment.

In an embodiment, the processor continuously updates the commit register maps of the various segments during processing, and evicts instructions that have been committed (speculatively or non-speculatively) from the ROB. As a result, ROB memory space can be released not only upon non-speculative commit, but also upon speculative commit.

In an embodiment, the processor continuously updates the commit register maps of the various segments during processing, and releases physical registers which are no longer needed. As a result, physical register utilization is higher as resources can be released not only upon non-speculative commit, but also upon speculative commit.

In an embodiment, when all the instructions of a segment are committed (speculatively or non-speculatively), the processor merges the speculative-commit database of this segment (including the commit register map) with the database of the following segment. Following the merge, the database of the earlier segment can be released, along with any physical resources that are no longer required.

In some embodiments, the processor is able to flush instructions even after they have been speculatively-committed and evicted from the ROB. For example, the processor may execute and speculatively-commit a load instruction in a given segment. Due to out-of-order processing, the processor may later execute a store instruction, which belongs to an earlier segment and which writes to the same address that the load instruction read from. In such a scenario, the value read by the load instruction is incorrect, and the load instruction and the instructions that follow it should therefore be flushed. In an embodiment, the processor flushes the appropriate instructions even though they have already been evicted from the ROB. The processor then recovers the (speculative) register map of the given segment by reverting to a previously-saved register map that precedes the load instruction and flushing all instructions of that segment.

The disclosed techniques are highly effective in parallelizing the committing of instructions, and in releasing physical resources of the processor following committing of instructions. Several examples of segment-level speculative-commit processes, using either a single ROB or multiple ROBs, are described in detail below. Methods for maintaining and merging multiple segment-level commit-register maps are also described.

System Description

Figure 1:
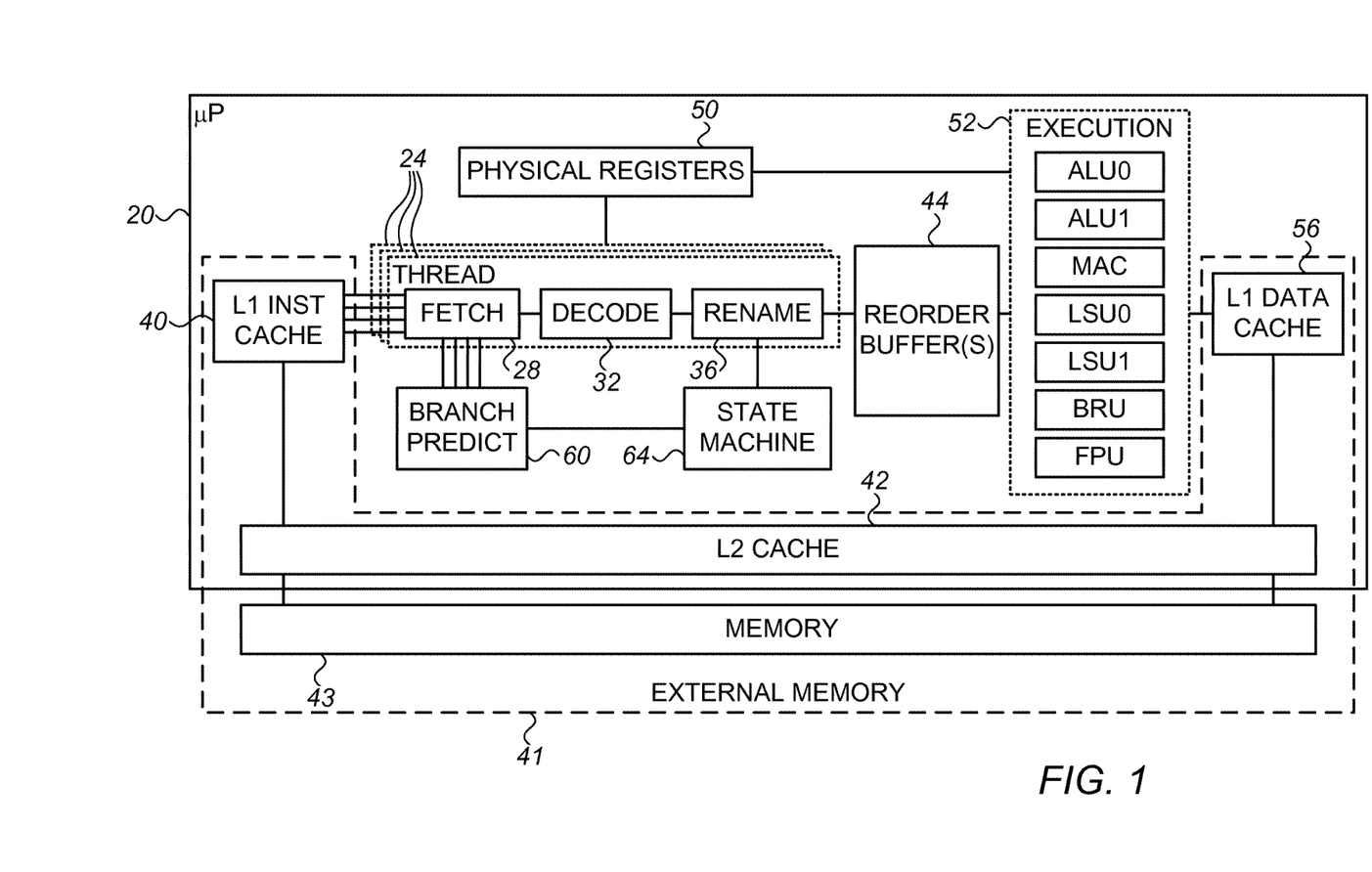
FIG. 1 is a block diagram that schematically illustrates a processor, in accordance with an embodiment of the present invention.

FIG. 1 is a block diagram that schematically illustrates a processor 20, in accordance with an embodiment of the present invention. Processor 20 runs pre-compiled software code, while parallelizing the code execution. Instruction parallelization is performed by the processor at run-time, by analyzing the program instructions as they are fetched from memory and processed.

In the present example, processor 20 comprises multiple hardware threads 24 that are configured to operate in parallel. Each thread 24 is configured to process one or more respective segments of the code. Certain aspects of thread parallelization are addressed, for example, in U.S. patent application Ser. Nos. 14/578,516, 14/578,518, 14/583,119, 14/637,418, 14/673,884, 14/673,889 and 14/690,424, which are all assigned to the assignee of the present patent application and whose disclosures are incorporated herein by reference.

In the present embodiment, each thread 24 comprises a fetching unit 28, a decoding unit 32 and a renaming unit 36. Fetching units 24 fetch the program instructions of their respective code segments from a memory, e.g., from a multi-level instruction cache. In the present example, processor 20 comprises a memory system 41 for storing instructions and data. Memory system 41 comprises a multi-level instruction cache comprising a Level-1 (L1) instruction cache 40 and a Level-2 (L2) cache 42 that cache instructions stored in a memory 43. Decoding units 32 decode the fetched instructions.

Renaming units 36 carry out register renaming. The decoded instructions provided by decoding units 32 are typically specified in terms of architectural registers of the processor's instruction set architecture. Processor 20 comprises a register file 50 that comprises multiple physical registers. The renaming units associate each architectural register in the decoded instructions to a respective physical register in register file 50 (typically allocates new physical registers for destination registers, and maps operands to existing physical registers).

The renamed instructions (e.g., the micro-ops/instructions output by renaming units 36) are buffered in-order in one or more Reorder Buffers (ROB) 44, also referred to as Out-of-Order (OOO) buffers. In alternative embodiments, one or more instruction queue buffers are used instead of ROB. The buffered instructions are pending for out-of-order execution by multiple execution units 52, i.e., not in the order in which they have been fetched.

The renamed instructions buffered in ROB 44 are scheduled for execution by the various execution units 52. Instruction parallelization is typically achieved by issuing one or multiple (possibly out of order) renamed instructions/micro-ops to the various execution units at the same time. In the present example, execution units 52 comprise two Arithmetic Logic Units (ALU) denoted ALU0 and ALU1, a Multiply-Accumulate (MAC) unit, two Load-Store Units (LSU) denoted LSU0 and LSU1, a Branch execution Unit (BRU) and a Floating-Point Unit (FPU). In alternative embodiments, execution units 52 may comprise any other suitable types of execution units, and/or any other suitable number of execution units of each type. The cascaded structure of threads 24 (including fetch units 28, decoding units 32 and renaming units 36), ROB and execution units 52 is referred to herein as the pipeline of processor 20.

The results produced by execution units 52 are saved in register file 50, and/or stored in memory system 41. In some embodiments the memory system comprises a multi-level data cache that mediates between execution units 52 and memory 43. In the present example, the multi-level data cache comprises a Level-1 (L1) data cache 56 and L2 cache 42.

In some embodiments, the Load-Store Units (LSU) of processor 20 store data in memory system 41 when executing store instructions, and retrieve data from memory system 41 when executing load instructions. The data storage and/or retrieval operations may use the data cache (e.g., L1 cache 56 and L2 cache 42) for reducing memory access latency. In some embodiments, high-level cache (e.g., L2 cache) may be implemented, for example, as separate memory areas in the same physical memory, or simply share the same memory without fixed pre-allocation.

A branch prediction unit 60 predicts branches or flow-control traces (multiple branches in a single prediction), referred to herein as "traces" for brevity, that are expected to be traversed by the program code during execution by the various threads 24. Based on the predictions, branch prediction unit 60 instructs fetching units 28 which new instructions are to be fetched from memory. Branch prediction in this context may predict entire traces for segments or for portions of segments, or predict the outcome of individual branch instructions. When parallelizing the code, e.g., as described in the above-cited patent applications, a state machine unit 64 manages the states of the various threads 24, and invokes threads to execute segments of code as appropriate.

In some embodiments, processor 20 parallelizes the processing of program code among threads 24. Parallelization tasks may be distributed or partitioned among various elements of processor 20.

The configuration of processor 20 shown in FIG. 1 is an example configuration that is chosen purely for the sake of conceptual clarity. In alternative embodiments, any other suitable processor configuration can be used. For example, in the configuration of FIG. 1, multi-threading is implemented using multiple fetching, decoding and renaming units. Additionally or alternatively, multi-threading may be implemented in many other ways, such as using multiple ROB, separate execution units per thread and/or separate register files per thread. In another embodiment, different threads may comprise different respective processing cores.

As yet another example, the processor may be implemented without cache or with a different cache structure, without branch prediction or with a separate branch prediction per thread. The processor may comprise additional elements not shown in the figure. Further alternatively, the disclosed techniques can be carried out with processors having any other suitable microarchitecture. As another example, it is not mandatory that the processor perform register renaming.

In the context of the present patent application and in the claims, the various processor elements other than the instruction buffer or buffers (e.g., ROB 44) is referred to collectively as "circuitry" that carries out the disclosed techniques.

Processor 20 can be implemented using any suitable hardware, such as using one or more Application-Specific Integrated Circuits (ASICs), Field-Programmable Gate Arrays (FPGAs) or other device types. Additionally or alternatively, certain elements of processor 20 can be implemented using software, or using a combination of hardware and software elements. The instruction and data cache memories can be implemented using any suitable type of memory, such as Random Access Memory (RAM).

Processor 20 may be programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In some embodiments, processor 20 monitors the code processed by one or more threads 24, identifies code segments that are at least partially repetitive, and parallelizes execution of these code segments. Certain aspects of parallelization functions, including definitions and examples of partially repetitive segments, are addressed, for example, in U.S. patent application Ser. Nos. 14/578,516, 14/578,518, 14/583,119, 14/637,418, 14/673,884, 14/673,889 and 14/690,424, cited above.

Parallel and Independent Speculative Committing of Instructions in Multiple Code Segments In some embodiments, processor 20 processes multiple segments of program code in parallel. At any given point in time, the oldest segment being processed (i.e., the earliest segment in the code whose instructions are still being processed in the processor pipeline, or the earliest segment in the code that has at least one instruction that is not committed) is defined as a non-speculative segment. The other segments being processed at the given point in time, which occur later than the non-speculative segment in the code, are defined as speculative segments.

The earliest segment is non-speculative because all the instructions that precede this segment have already been committed. Therefore, a non-speculative segment cannot be flushed due to flushing of a previous segment. A non-speculative segment is also referred to as a Time-Consistent (TC) segment. A speculative segment, on the other hand, is regarded as speculative because it is preceded by instructions and segments that have not been committed yet and may still be flushed, which in turn will cause the speculative segment to be flushed as well.

When processing a non-speculative segment, the instructions of the segment are issued from ROB 44 for execution in units 52. Following out-of-order execution, results are committed in order. Once all the instructions of the non-speculative segment have been committed, the processor defines the next segment in the code as the non-speculative segment.

When processing a speculative segment, the instructions of the segment are similarly issued from ROB 44 for execution by execution units 52. Following execution, however, the situation is different, because the instructions of a speculative segment may be flushed due to events in preceding segments. Thus, executed instructions in a speculative segment cannot be committed until the segment becomes non-speculative.

This constraint—Not being able to commit instructions of a speculative segment—is problematic and degrades the processor performance. For example, when a segment cannot be committed even though it has been fully executed, physical resources of the processor cannot be released.

In some embodiments of the present invention, processor 20 overcomes this problem by defining two levels of committing instructions Speculative committing and non-speculative committing. In these embodiments, the processor speculatively-commits the instructions of each segment, independently of the execution progress in other segments. While committing instructions of a segment, the processor circuitry releases some the physical resources used for processing the instructions. Resources are released regardless of whether the committed segment was speculative (in which case the commit was a speculative commit) or non-speculative (in which case the commit was a non-speculative commit).

The description below explains an example implementation, in which speculative committing is applied to multiple segments in parallel in one or more ROB 44. The disclosed techniques, however, are not limited to ROB-based configurations, and can be implemented in any other suitable way.

In some embodiments, hardware threads 24 process multiple segments in parallel, including renaming of registers in renaming units 36. At any given time, one of the segments being processed is non-speculative. Any additional segment or segments being processed, if such exist, are speculative. For renaming registers in a speculative segment, the circuitry typically creates a speculative initial mapping of architectural registers to physical registers, and renaming unit 36 starts renaming the registers in the speculative segment using this initial mapping. Further aspects of renaming in speculative segments are addressed in a U.S. patent application Ser. No. 14/924,833 to Tennenhaus et al. (now issued as U.S. Pat. No. 9,430,244) entitled "Run-Time Code Parallelization Using Out-Of-Order Renaming with Pre-Allocation of Physical Registers," which is assigned to the assignee of the present patent application and whose disclosure is incorporated herein by reference.

In some embodiments, hardware threads 24 write (dispatch) the instructions of the multiple segments to multiple respective regions allocated in (one or more) ROB 44. The instructions are written (dispatched) to the ROB in-order (within each segment), i.e., in the order in which they have been fetched by fetching unit 28. Instructions from different segments may be written to the ROB out-of-order to their allocated regions. In some embodiments, multiple segments may be dispatched sequentially into a specific ROB region.

The instructions of the various segments (both speculative and non-speculative) are issued from ROB 44 for execution, not necessarily in-order.

For at least some of the segments (speculative or non-speculative), processor 20 holds per segment a respective data structure referred to as a speculative-commit database, commit database, or simply database (DB) for brevity. The database of a certain segment comprises, among other information, a commit register map. The commit register map is a mapping of architectural registers to physical registers that is up-to-date for the most-recently committed (speculatively or non-speculatively) instruction in the segment. The commit register map in the commit database is used for tracking the current (possibly speculative) commit-point in the segment. In addition to the commit register map, the database may comprise information such as the number of stores and loads in the segment, or the number of branches in the segment.

The processor continuously updates the databases of the various segments as the instructions are committed (speculatively or non-speculatively). In addition, the circuitry may evict instructions that have been speculatively-committed from the ROB, thereby freeing ROB space and other physical resources.

When all the instructions in a certain segment have been committed (speculatively or non-speculatively), the circuitry merges the database of the committed segment with the database of the subsequent segment. The process of merging, and in particular merging of the commit register maps of the two segments, is described in greater detail further below.

After merging, the circuitry releases the database and other resources of the older segment that are no longer needed. The processor is typically capable of handling only a limited number of databases simultaneously, and therefore releasing a database enables the processor to begin handling an additional segment.

In some embodiments, the commit databases and the ROB regions of the various segments are processed in a similar manner, regardless of whether the segments are speculative or non-speculative. Only some higher layer in the processor is aware of the identity of the non-speculative (time-consistent) segment at any given time. The commit register map of this segment is part of the architectural state of the processor. The commit register maps of the other (speculative) segments are updated during segment execution, merged or flushed as appropriate. When a speculative segment becomes non-speculative, its commit register map is representing the registers architectural state of the processor.

In some embodiments the processor is able to commit only a limited number of instructions per cycle. In such embodiments, the circuitry may apply a suitable arbitration scheme in order to choose from which segment to commit the next instruction or instructions.

Figure 2:
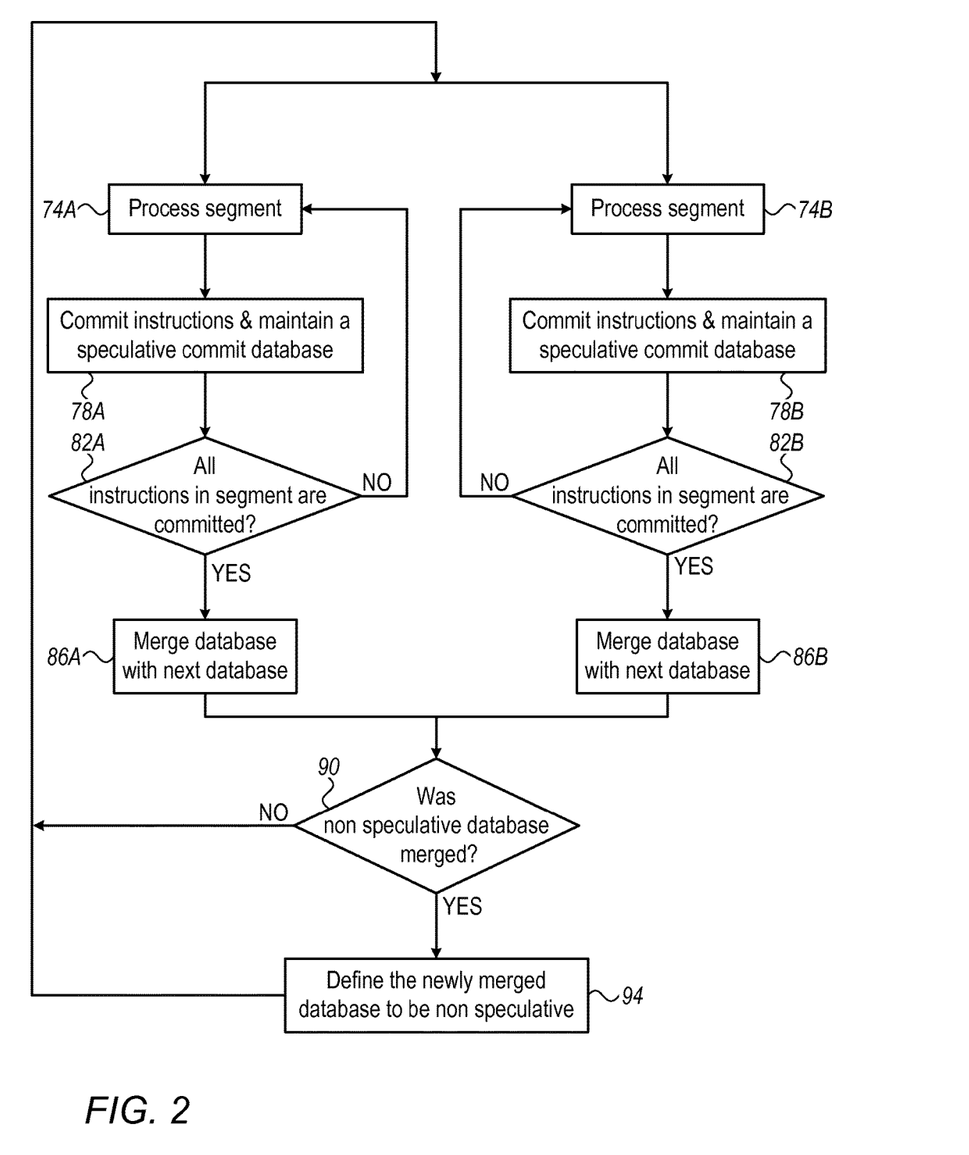
FIG. 2 is a flow chart that schematically illustrates a method for independent segment-level speculative committing of instructions, in accordance with an embodiment of the present invention.

FIG. 2 is a flow chart that schematically illustrates a method for independent segment-level speculative committing of instructions, in accordance with an embodiment of the present invention. The method begins with the circuitry defining the earliest segment being processed as non-speculative and any remaining segments being processed as speculative.

Processor 20 processes the segments in parallel. The present example shows two segments being processed, represented by two processing steps 74A and 74B. In an embodiment, hardware threads 24 write the renamed instructions of the segments to the respective allocated regions in ROB 44.

At committing steps 78A and 78B, the circuitry speculatively-commits the instructions in the segments, including managing the respective commit databases of the segments.

At commit completion steps 82A and 82B, the circuitry checks, per segment, whether all the instructions of the segment have been committed. If not, the method loops back to continue segment processing. Upon finding that all the instruction of a certain segment have been committed, the circuitry merges the speculative commit database of this segment with the speculative commit database of the following segment in the code, at merging steps 86A and 86B.

At a non-speculative merge checking step 90, the circuitry checks whether the non-speculative commit database (the database of the non-speculative segment) has been merged. If so, the circuitry defines the newly merged commit database as the non-speculative (time consistent) database, at a non-speculative database definition 94.

Figure 3:
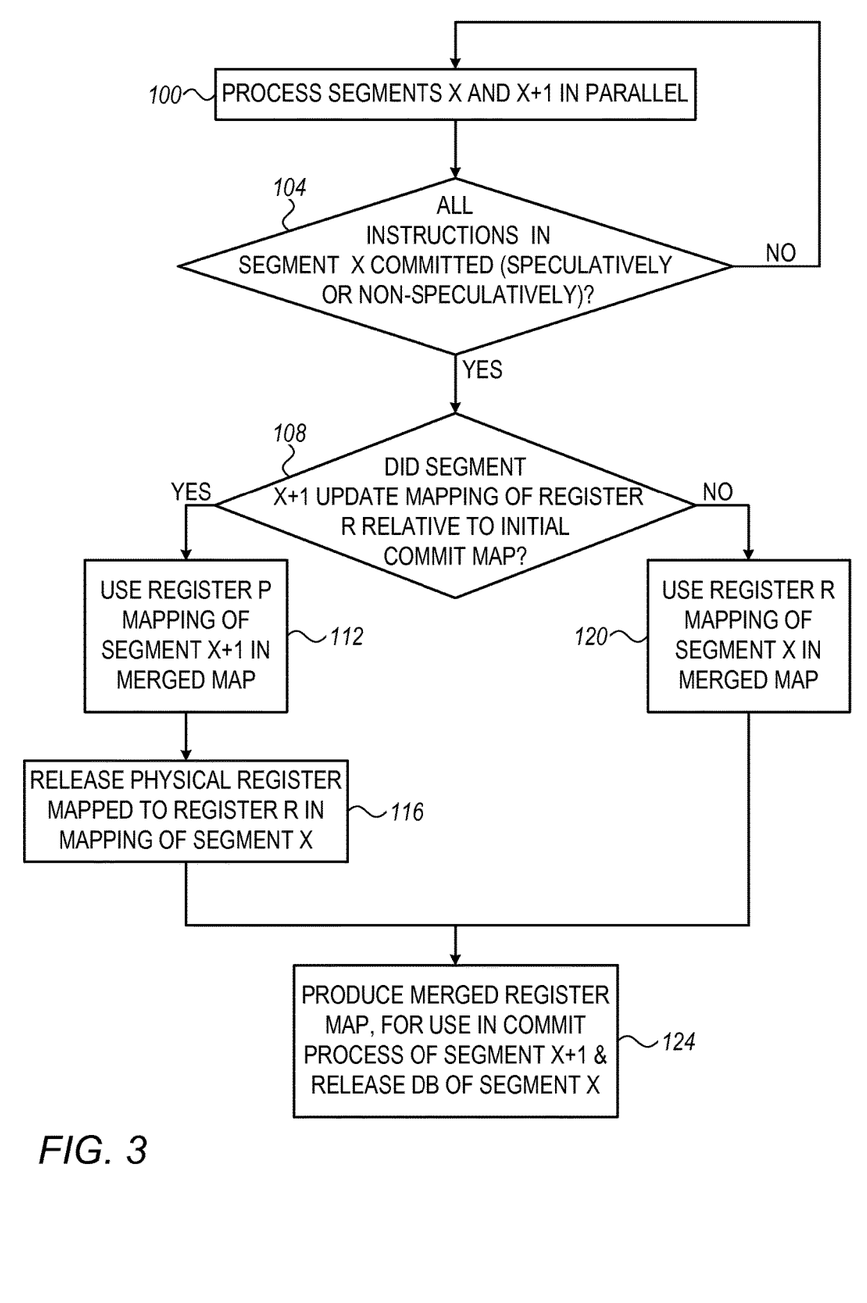
FIG. 3 is a flow chart that schematically illustrates a method for merging segment-level speculative-commit databases, in accordance with an embodiment of the present invention.

FIG. 3 is a flow chart that schematically illustrates a method for merging segment-level commit databases (speculative or non-speculative), in accordance with an embodiment of the present invention. The merging process uses the following rules:

Merging can be performed between any two segments that are adjacent in the program code.

In order to merge two segments, all the instructions in the older segment should be committed (possibly speculatively).

The newer of the two segments can be in any state of committing.

At the end of the merging process, the merged database will serve as the commit database (speculative or non-speculative) of the newer of the two segments.

In the merged commit register map, a given architectural register is mapped either to the physical register to which that architectural register is mapped in the commit register map of the older segment, or to the physical register to which that architectural register is mapped in the commit register map of the newer segment. If the newer segment has updated the mapping of the architectural register relative to its initial commit register map, then the physical register specified in the register map of the newer segment is used. If the newer segment did not update the mapping of the architectural register relative to its initial commit register map, the physical register specified in the register map of the older segment is used.

When the mapping of a given architectural register in the merged register map is taken from the register map of the newer segment, the physical register mapped to this architectural register in the register map of the older segment can be released.

The merged register map is subsequently used by the newer segment.

The method of FIG. 3 begins with the circuitry processing two successive segments denoted X and X+1 in parallel, at a segment processing step 100. At a commit step 104, the circuitry checks whether all the instructions in segment X have been committed (speculatively or non-speculatively). If so, the circuitry begins a process of merging the commit register maps of the two segments.

At a merging start step 108, the circuitry checks, per each architectural register R, whether the architectural-to-physical register mapping of that register was updated during segment X+1 relative to the initial commit map that was assigned to the segment when it was invoked. In an embodiment, the register map database of each segment indicates, per architectonic register, whether the mapping was updated, and the circuitry may use this indication for checking whether the architectural-to-physical register mapping of an architectural register was updated during the committing of instructions of a segment.

For each architectural register R whose mapping in the initial commit map of segment X+1 was modified during the committing of instructions of segment X+1, the circuitry imports the mapping specified in the commit register map of segment X+1 into the merged commit register map, at a first importing step 112. The circuitry may then release the physical register to which the architectural register was mapped in the map of segment X, at a releasing step 116. (Note that releasing of the physical register is not mandatory.)

For each architectural register whose mapping in the initial commit map of segment X+1 was not modified during the committing of instructions of segment X+1, the circuitry imports the mapping specified in the commit register map of segment X into the merged commit register map, at a second importing step 120.

The circuitry then produces the merged commit register map for use by segment X+1 following the merge, at a merged map generation step 124. At this stage the database of segment x may be released.

In the examples above, processor 20 releases physical resources, such as physical registers and commit databases, following speculative or non-speculative-commit. Additionally or alternatively, the processor may use speculative committing of instructions to release other suitable physical resources. For example, in a given segment, the processor may hold a register map not only for the most-recently committed instruction, but also for one or more intermediate locations in the segment. If branch mis-prediction occurs and the processor is required to flush instructions and fetch alternative instructions in the segment, such an intermediate register map can be used as a starting point for creating a corrected commit-register map. The intermediate register maps are therefore referred to as "flush checkpoints." In some embodiments, the processor releases a flush checkpoint when the following instructions in the segment have been speculatively-committed.

In some embodiments, the initial architectural-to-physical register mapping of a given segment does not have to be full, i.e., it may comprise at least one "Not Allocated" (NA) entry indicating an architectural register that is used in the segment but is not (yet) mapped to a physical register. Processor 20 may begin speculative committing using an incomplete, partial mapping, and assume that subsequent merging with earlier segments will complete the missing entries.

Example ROB Management Scenarios

FIGS. 4A-4E are diagrams that schematically illustrate a process for parallel speculative committing of instructions in multiple code segments, in accordance with an embodiment of the present invention. In the present example processor 20 uses two ROBs 44 denoted ROB[0] and ROB[1], by way of example. Generally, the processor may use any other suitable number of ROBs, including a single ROB.

The use of multiple ROBs is advantageous for several reasons. For example, the processor circuitry may use each ROB for buffering instructions of a code region that is not affected by branch mis-prediction in the other code regions. As such, the above-described processes (e.g., merging commit databases, releasing physical resources and flushing segments) can be performed independently within each ROB. As another example, the circuitry may use multiple ROBs in order to allow simultaneous writing of several segments into the ROBs, e.g., starting to write a later segment before the instructions of an earlier segment have all been written.

The figures show the state of ROBs 44 during the various stages of handling the multiple segments. The segments in the present example are numbered 1.1, 1.2, 1.3, 1.4, . . . . In accordance with their order in the program code. The circuitry typically manages a single pool of speculative-commit databases jointly for the multiple ROBs. In particular, at any given time only one of the segments being processed across the multiple ROBs is defined as non-speculative (Time-Consistent—TC). The speculative-commit database used by each segment is shown in the figure next to the ROB region allocated to that segment. The caption at the top-right corner specifies the identity of the database of the Time-Consistent (TC) segment, i.e., the non-speculative segment.

Figure 4A:
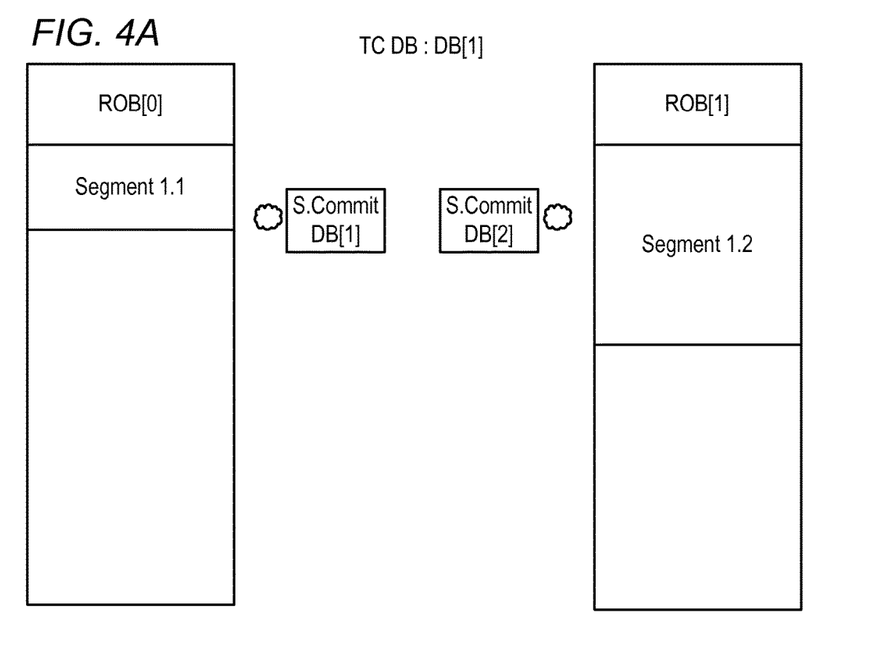
FIGS. 4A-4E are diagrams that schematically illustrate a process for parallel speculative committing of instructions in multiple code segments using multiple reorder buffers, in accordance with an embodiment of the present invention.

FIG. 4A shows an initial point in time in which the instructions of segment 1.1 are written to ROB[0] and update database DB[1], and the instructions of segment 1.2 are written to ROB[1] and update database DB[2]. Segment 1.1 is initially the non-speculative segment, thus DB[1] is the TC DB.

Figure 4B:
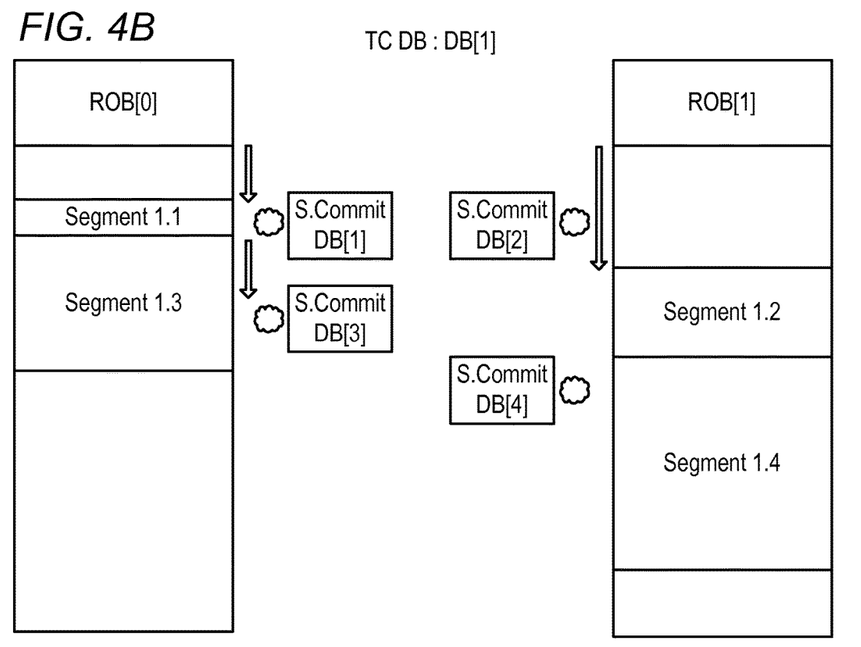

FIG. 4B shows the state of ROB[0] and ROB[1] at a later point in time. As can be seen in the figure, some of the instructions of segments 1.1 and 1.2 have been executed, committed, and evicted from the ROBs. In addition, two new segments have been added to the ROBs—segment 1.3 is written to ROB[0] and is assigned DB[3], and segment 1.4 is written to ROB[1] and is assigned DB[4]. The circuitry speculatively-commits all segments independently, and typically evicts the instructions of the oldest segment in each ROB. In some embodiments all segments may be evicted independently.

The arrow next to each ROB region marks the progress of speculative-commit. The edge of the arrow marks the (speculative) commit point, i.e., the most-recently (speculative) committed instruction in the segment. The circuitry updates the speculative-commit database of each segment continually to reflect the register mapping at the commit point.

Figure 4C:
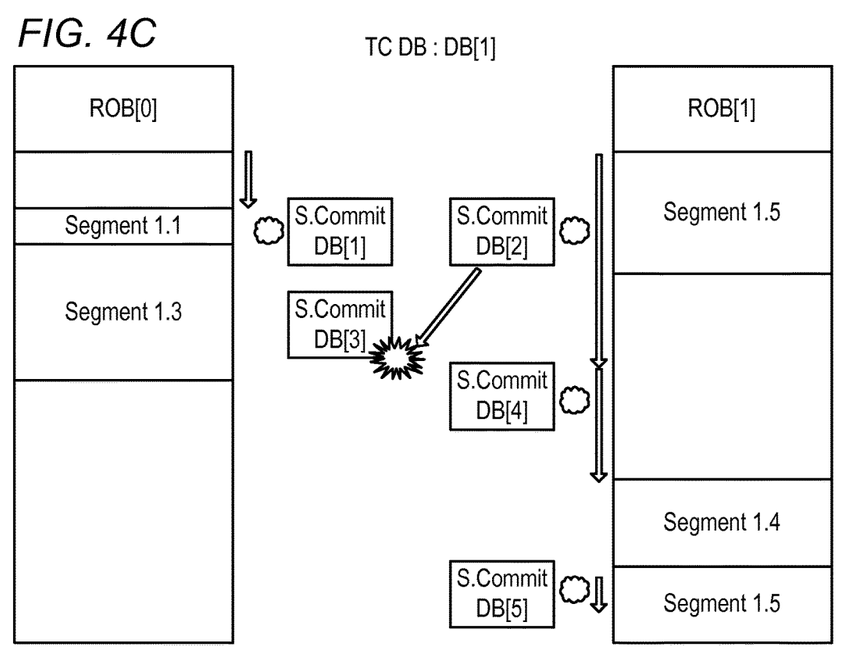

FIG. 4C shows the state of ROB[0] and ROB[1] at a later point in time, and also demonstrates merging of speculative-commit databases. At this point in time, all the instructions of segment 1.2 are speculatively-committed. Therefore, the circuitry merges DB[2] (which was assigned to segment 1.2) with DB[3] (which is assigned to segment 1.3 that follows segment 1.2 in the code). Also in FIG. 4C, segment 1.5 is added and assigned DB[5]. This example demonstrates the cyclical operation of each ROB. The instructions of segment 1.5 are written sequentially, and at some stage reach the end (bottom) of the ROB and wraparound to the beginning (top) of the ROB.

Figure 4D:
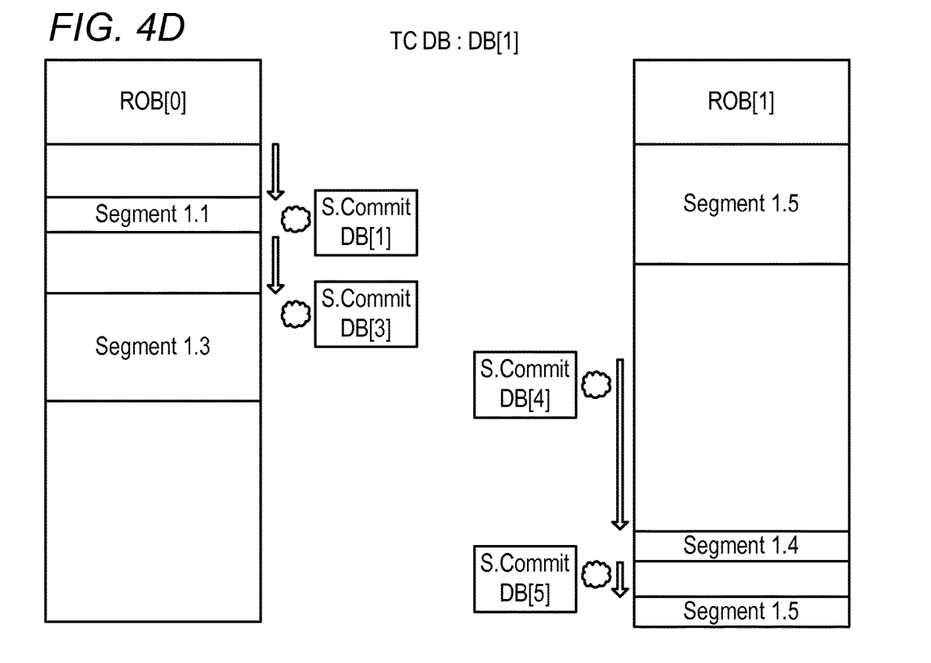

FIG. 4D shows the state of the ROBs after the merge of DB[2] and DB[3] is completed. At this stage DB[2] is released and is free for assignment to a new segment.

Figure 4E:
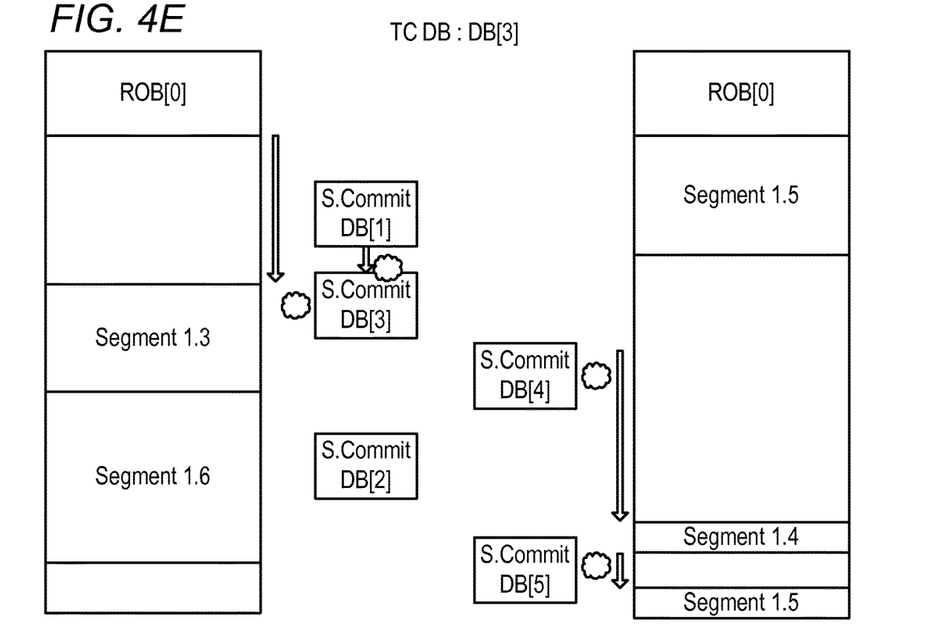

FIG. 4E shows the state of ROB[0] and ROB[1] at a later time, in which all the instructions of segment 1.1 are committed. At this stage the circuitry merges DB[1] (which was assigned to segment 1.1) with DB[3] (which is currently assigned to segment 1.3). Since segment 1.1 was the non-speculative segment, after the merge segment 1.3 becomes the non-speculative segment and DB[3] becomes the TC DB.

Flush-Triggering Instructions, and Flushing of Instructions that have been Evicted from ROB In some embodiments, the circuitry of processor 20 is able to flush instructions even after they have been speculatively-committed and evicted from ROB 44. Furthermore, the processor is able to evict instructions which would later be found to cause a flush. In these embodiments, the circuitry encounters a "flushing instruction," i.e., an instruction which all instructions after it (and possibly this instruction as well) should be flushed. Since the processor processes segments out-of-order, in some cases the flushing instruction may already be speculatively-committed and evicted from the ROB.

Figure 5:
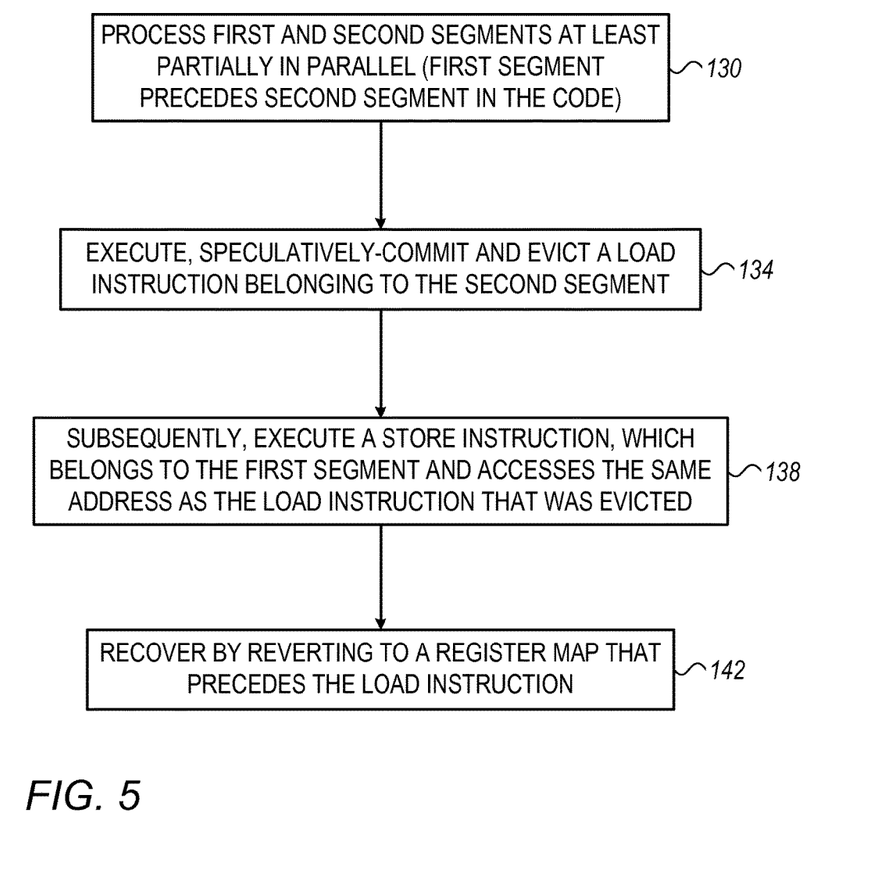
FIG. 5 is a flow chart that schematically illustrates a method for flushing instructions that have been speculatively-committed and evicted, in accordance with an embodiment of the present invention.

FIG. 5 is a flow chart that schematically illustrates a method for flushing instructions that have been speculatively-committed and evicted, in accordance with an embodiment of the present invention. The example of FIG. 5 refers to a scenario that is referred to herein as "Load Before Store" (LBS). In this scenario, the circuitry processes two segments denoted segment1 and segment2 at least partially in parallel, at a segment processing step 130. Segment1 occurs earlier in the program code than segment2.

At a segment2 processing step, as part of processing segment2, the circuitry executes, speculatively-commits and evicts from the ROB a load instruction belonging to segment2. At a later point in time, at a segment1 processing step 138, the circuitry executes a store instruction that (i) belongs to segment1 and (ii) writes to the same memory address that the load instruction read from.

Under these conditions, the value read by the load instruction is incorrect. The circuitry, however, identified this fact only after the load instruction has been speculatively-committed and evicted from the ROB.

Nevertheless, in this embodiment, the processor then recovers the (speculative) register map of segment2 by reverting to a previously-saved register map that precedes the load instruction and all instructions after this point including the flushing load instruction, at a recovery step 142.

In the LBS example of FIG. 5, the flushing instruction is the load instruction in segment2. In alternative embodiments, various other types of instructions may be found to be flushing instructions after they have been evicted.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a processor that processes multiple segments of a sequence of instructions of program code, wherein each segment is defined as either speculative or non-speculative, dispatching the instructions of the segments into at least one instruction buffer;
executing the instructions of the segments; and
in each segment, speculatively-committing at least some of the executed instructions of the segment from the at least one instruction buffer independently of any other segment,
wherein dispatching the instructions comprises dispatching the instructions of a first segment into a first region of the at least one instruction buffer, and dispatching the instructions of a second segment, which occurs later in the program code than the first segment, into a second region of the at least one instruction buffer before all the instructions of the first segment have been dispatched into the first region.

2. The method according to claim 1, wherein the at least one instruction buffer comprises one or more reorder buffers (ROB) or instruction-queue buffers.

3. The method according to claim 1, wherein a segment is defined as non-speculative if the segment is the earliest segment in the program code that has at least one instruction that is not committed, and defined as speculative otherwise.

4. The method according to claim 1, wherein speculatively-committing the executed instructions comprises updating for each segment an architectural-to-physical register mapping pertaining to the most-recent speculatively-committed instruction in the segment.

5. The method according to claim 4, wherein updating the architectural-to-physical register mapping comprises retaining a speculative architectural-to-physical register mapping of a speculative segment until the speculative segment is flushed or merged with another segment.

6. The method according to claim 4, and comprising, upon speculatively or non-speculatively committing all the instructions in a first segment, merging the architectural-to-physical register mapping of the first segment with the architectural-to-physical register mapping of a second segment that immediately follows the first segment in the program code.

7. The method according to claim 6, and comprising, if the first segment was non-speculative, defining a merged segment resulting from the merged first and second segments as non-speculative.

8. The method according to claim 6, wherein merging the architectural-to-physical register mapping comprises producing for the second segment a merged architectural-to-physical register mapping by choosing, per architectural register, either a mapping of the architectural register used in the first segment, or the mapping of the architectural register used in the second segment.

9. The method according to claim 6, wherein merging the architectural-to-physical register mapping comprises releasing at least some physical resources of the architectural-to-physical register mapping of the first segment.

10. The method according to claim 6, and comprising, following merging the architectural-to-physical register mapping, releasing a data structure holding the architectural-to-physical register mapping of the first segment.

11. The method according to claim 4, wherein speculatively-committing the executed instructions comprises initiating speculative committing of a given segment while the architectural-to-physical register mapping is missing a mapping of at least one architectural register used in the given segment.

12. The method according to claim 1, wherein speculatively-committing the executed instructions comprises evicting one or more of the speculatively-committed instructions from the at least one instruction buffer.

13. A method, comprising:
in a processor that processes multiple segments of a sequence of instructions of program code, writing the instructions of the segments into at least one instruction buffer, executing the written instructions, speculatively-committing at least some of the executed instructions of each segment independently of any other segment, and evicting one or more of the speculatively-committed instructions from the at least one instruction buffer;

executing instructions belonging to a first segment, which occurs earlier in the program code than a second segment; and in response to detecting that the processing of the instructions of the first segment requires flushing of instructions starting from a given instruction in the second segment, flushing the instructions belonging to the second segment even when the given instruction has been evicted from the at least one instruction buffer.

14. The method according to claim 13, wherein executing the instructions belonging to the first segment is performed after at least one of the instructions belonging to the second segment has been evicted.

15. The method according to claim 13, and comprising, upon flushing the given instruction, recovering a state of the second segment by reverting to a previously-saved state that precedes the flushed instructions of the second segment.

16. The method according to claim 13, wherein the given instruction is a load instruction, which accesses the same address as a store instruction in the first segment.

17. A processor, comprising:
at least one instruction buffer; and
circuitry, which is configured to process multiple segments of a sequence of instructions of program code, wherein each segment is defined as either speculative or non-speculative, to dispatch the instructions of the segments into the at least one instruction buffer, to execute the instructions of the segments, and, in each segment, to speculatively-commit at least some of the executed instructions of the segment from the at least one instruction buffer independently of any other segment,
wherein the instructions of a first segment are dispatched into a first region of the at least one instruction buffer, and the instructions of a second segment, which occurs later in the program code than the first segment, are dispatched into a second region of the at least one instruction buffer before all the instructions of the first segment have been dispatched into the first region.

18. The processor according to claim 17, wherein the at least one instruction buffer comprises one or more reorder buffers (ROB) or instruction-queue buffers.

19. The processor according to claim 17, wherein a segment is defined as non-speculative if the segment is the earliest segment in the program code that has at least one instruction that is not committed, and defined as speculative otherwise.

20. The processor according to claim 17, wherein the circuitry is configured to update for each segment an architectural-to-physical register mapping pertaining to the most-recent speculatively-committed instruction in the segment.

21. The processor according to claim 20, wherein the circuitry is configured to retain a speculative architectural-to-physical register mapping of a speculative segment until the speculative segment is flushed or merged with another segment.

22. The processor according to claim 20, wherein, upon speculatively or non-speculatively committing all the instructions in a first segment, the circuitry is configured to merge the architectural-to-physical register mapping of the first segment with the architectural-to-physical register mapping of a second segment that immediately follows the first segment in the program code.

23. The processor according to claim 22, wherein, if the first segment was non-speculative, the circuitry is configured to define a merged segment resulting from the merged first and second segments as non-speculative.

24. The processor according to claim 22, wherein the circuitry is configured to produce for the second segment a merged architectural-to-physical register mapping by choosing, per architectural register, either a mapping of the architectural register used in the first segment, or the mapping of the architectural register used in the second segment.

25. The processor according to claim 22, wherein, in merging the architectural-to-physical register mapping, the circuitry is configured to release at least some physical resources of the architectural-to-physical register mapping of the first segment.

26. The processor according to claim 22, wherein, following merging the architectural-to-physical register mapping, the circuitry is configured to release a data structure holding the architectural-to-physical register mapping of the first segment.

27. The processor according to claim 20, wherein the circuitry is configured to initiate speculative committing of a given segment while the architectural-to-physical register mapping is missing a mapping of at least one architectural register used in the given segment.

28. The processor according to claim 17, wherein the circuitry is configured to evict one or more of the speculatively-committed instructions from the at least one instruction buffer.

29. A processor, comprising:
at least one instruction buffer; and
circuitry, which is configured to process multiple segments of a sequence of instructions of program code, to write the instructions of the segments into the at least one instruction buffer, to execute the written instructions, to speculatively-commit at least some of the executed instructions of each segment independently of any other segment, to evict one or more of the speculatively-committed instructions from the at least one instruction buffer, to execute instructions belonging to a first segment, which occurs earlier in the program code than a second segment, and, in response to detecting that the processing of the instructions of the first segment requires flushing of instructions starting from a given instruction in the second segment, to flush the instructions belonging to the second segment even when the given instruction has been evicted from the at least one instruction buffer.

30. The processor according to claim 29, wherein the circuitry is configured to execute the instructions belonging to the first segment after at least one of the instructions belonging to the second segment has been evicted.

31. The processor according to claim 29, wherein, upon flushing the given instruction, the circuitry is configured to recover a state of the second segment by reverting to a previously-saved state that precedes the flushed instructions of the second segment.

32. The processor according to claim 29, wherein the given instruction is a load instruction, which accesses the same address as a store instruction in the first segment.

* * * * *